United States Patent
Toft et al.

(10) Patent No.: US 12,099,034 B2
(45) Date of Patent: Sep. 24, 2024

(54) METHOD AND SYSTEM FOR EARLY FAULT DETECTION IN A WIND TURBINE GENERATOR

(71) Applicant: Ørsted Wind Power A/S, Fredericia Skaerbaek (DK)

(72) Inventors: Anders Saaby Toft, Gentofte (DK); Bjarke Nordentoft Madsen, Fredericia Skaerbaek (DK); Christopher Dam Jensen, Fredericia Skaerbaek (DK)

(73) Assignee: Ørsted Wind Power A/S, Fredericia (DK)

( * ) Notice: Subject to any disclaimer, the term of this patent is extended or adjusted under 35 U.S.C. 154(b) by 126 days.

(21) Appl. No.: 17/344,647

(22) Filed: Jun. 10, 2021

(65) Prior Publication Data
US 2021/0389276 A1 Dec. 16, 2021

(30) Foreign Application Priority Data
Jun. 11, 2020 (EP) .................................. 20179579

(51) Int. Cl.
*G01N 27/82* (2006.01)

(52) U.S. Cl.
CPC .................................. *G01N 27/82* (2013.01)

(58) Field of Classification Search
CPC ...... G01N 27/82; F05B 2260/80; F03D 17/00
See application file for complete search history.

(56) References Cited

U.S. PATENT DOCUMENTS

| 2007/0063859 A1* | 3/2007 | Twerdochlib ........... F01D 17/02 340/679 |
| 2008/0191891 A1* | 8/2008 | Twerdochlib ......... F01D 21/003 340/679 |
| 2014/0348650 A1* | 11/2014 | Hansen ................. F03D 7/0204 416/9 |
| 2017/0153286 A1* | 6/2017 | Rodriguez Izal .. G01N 29/4445 |
| 2020/0025177 A1* | 1/2020 | Redding ................... F03D 7/00 |
| 2020/0400127 A1* | 12/2020 | Lowenhar .............. G01N 29/14 |

* cited by examiner

*Primary Examiner* — Dominic E Hawkins

(57) ABSTRACT

A method and system for early fault detection in a wind turbine generator (7). A particulate sensor (9) is provided in the generator housing (8). The accumulation of particulate debris is monitored using the particulate sensor (9). A potential fault may be identified based at least in part on the accumulation of particulate debris on the sensor (9).

13 Claims, 4 Drawing Sheets

METHOD AND SYSTEM FOR EARLY FAULT DETECTION IN A WIND TURBINE GENERATOR

This application claims priority to European Application No. 20179579.6, filed Jun. 11, 2020. The entire disclosure of the afore-mentioned patent application is incorporated herein by reference.

The present invention concerns a method and system for early fault detection in a wind turbine generator and, in particular, a method and system for identifying the early stages of stator wedge failure for triggering pre-emptive maintenance.

In this application, the term "wind turbine generator" is used to refer to the electrical generator itself, whereas the term "wind turbine" is used to refer to the whole wind turbine assembly, including the tower, blades, nacelle and the generator. Nevertheless, in the art, the terms "wind turbine generator" and "wind turbine" are sometimes used interchangeably depending on the context.

Wind turbines present unique set of issues in terms of maintenance and repair. In particular, they are typically located offshore or in otherwise remote locations, and the generator is housed in an elevated position within a nacelle on top of a tower making access difficult. As such, maintenance and repair operations are expensive and hazardous, and require specialist vehicles and equipment. At the same time, wind turbine generators are also uniquely prone to failure. That is, other electric generator applications are typically operated in a relatively steady state and within relatively controlled environmental conditions. This provides for some level of predictability in terms of operating wear and, in turn, allows servicing intervals to be scheduled to identify defects before they lead to catastrophic failure. In contrast, wind turbine generators are subjected to huge variations in load as wind speeds and directions change, as well as large variations in thermal stresses with changing weather conditions. As such, these variations often accelerate certain failure modes in ways that are difficult to predict, meaning that it is very challenging to pre-empt issues with regular servicing. Accordingly, not only is wind turbine generator servicing more expensive and challenging, but it is also much more difficult to predict when servicing is needed.

Furthermore, when wind turbine generators do fail, undertaking repair operations are also extremely expensive, especially offshore due to the costs associated with the jack-up vessels. Firstly, as failure often occurs unexpectedly, it can take time to arrange for a repair crew to reach the site to perform the necessary repairs. Moreover, until the repair crew is on site, they won't necessarily know what parts are needed for the repair. As such, the generator down times can be significant. Catastrophic failure in the generator can also lead to damage to other parts of the wind turbine assembly. Again, because of the unique difficulties and hazards of accessing the site, these repairs can be much more challenging than they would in other generator applications.

The present invention therefore seeks to address the above issues.

According to a first aspect of the present invention, there is provided a method for early fault detection in a wind turbine generator, the method comprising: providing a particulate sensor in the generator housing; monitoring the accumulation of particulate debris using the particulate sensor; and identifying a potential fault based at least in part on the accumulation of particulate debris.

In this way, the presence of particulate debris circulating in the air within the generator's housing may be used as an early indicator of the loosening of the generator's stator assembly. That is, deterioration of a stator wedge may be identified based on debris within the generator's internal closed-circuit air circulation when the wedge becomes loose and before it is ejected. Once a wedge has been ejected, the underlying winding is left unsupported, which could then lead to winding damage, flashover, and generator failure. As such, embodiments of the present invention allow for early identification of wedge loosening so that a maintenance operation may be pre-emptively triggered. Importantly, the generator does not need to be taken out of service; monitoring may take place while the generator is running. Furthermore, the generator may remain running until a servicing crew is able to undertake maintenance. As such, operating downtime may be minimised. This contrasts with conventional wedge testing methods which would involve the generator first being taken out service and then the tightness of each individual wedge being manually tested, typically by applying a hammer impact and analysing the acoustic feedback. In practice, such conventional wedge testing methods are therefore simply not be practical in the context of a wind turbine.

In embodiments, the particulate sensor has a detector end, and the step of providing a particulate sensor comprises locating the detector end for projecting into the airflow within the generator housing. In this way, the sensor may detect debris circulating in the turbulent airflow generated within the housing during operation of the generator. As such, rather than detect localised deposits of debris, the sensor may detect the particulates carried in the air, thereby allowing for a more consistent measure of the accumulation of particulates.

In embodiments, the step of providing the particulate sensor comprises locating the particulate sensor such that the detector end is elevated above a base of the generator housing. In this way, the sensor is more optimally located for detecting particulates carried in the air.

In embodiments, the step of providing a particulate sensor comprises mounting the particulate sensor to a bracket within the interior of the generator housing. In this way, simplified installation of the sensor is facilitated, and the risk of interfering with other sensor systems within the generator housing is mitigated.

In alternative embodiments, the step of providing a particulate sensor comprises mounting the particulate sensor through an end plate of the generator housing. In this way, consistent measurement of debris accumulation may be achieved, whilst at the same time the sensor can be easily accessed for connection to a processor for interpreting the sensor's readings. In preferred embodiments, the particulate sensor is mounted through the drive-end plate of the generator housing. In embodiments, the particulate sensor may be installed through an inspection hole provided in the generator housing.

In embodiments, the particulate sensor comprises a magnet and an inductance coil; and the step of monitoring the accumulation of particulate debris comprises monitoring the inductance in the inductance coil caused by particulate debris accumulated by the magnet. In this way, a strong permanent magnet may be used to attract and retain ferromagnetic wedge debris circulating in the air within the generator housing. The inductance within the inductance coil may then indicate the amount of debris particles accumulated. As such, embodiments may thereby provide real-time monitoring of the amount of ferrous wear and failure particles that have been released.

In embodiments, the step of identifying a potential fault comprises determining when the accumulation of particulate debris exceeds a threshold. In this way, the scheduling of preventative maintenance may be triggered by the quantity of detected debris exceeding a predetermined level.

In embodiments, the step of identifying a potential fault comprises detecting an acceleration in the rate of accumulation of particulate debris. In this way, a rapid increase in the rate of accumulation of particulate debris may be used as an indicator of accelerating failure modes within the generator, and may thereby be used to indicate maintenance is required.

According to a second aspect of the present invention, there is provided an early fault detection system for a wind turbine generator, comprising: a particulate sensor; a mounting for mounting the particulate sensor in the generator housing; a processor for monitoring the accumulation of particulate debris using the particulate sensor for identifying a potential fault based at least in part on the accumulation of particulate debris.

In this way, an apparatus for early fault detection within a wind turbine generator may be provided. As the wedges within the generator's stator assembly begin to loosen over time, the particulate debris released may be monitored in real-time by the system and used to instigate preventative maintenance before failure. As such, the generator repairs may be scheduled to minimise operating downtime.

In embodiments, the particulate sensor has a detector end for projecting into the airflow within the generator housing when mounted. In this way, a consistent measure of the accumulation of particulates may be achieved.

In embodiments, when mounted, the detector end of the particulate sensor is elevated above a base of the generator housing. In this way, the sensor may be optimally located for detecting particulates carried in the air.

In embodiments, the mounting comprises a bracket for supporting the particulate sensor within the generator housing. In this way, simplified installation of the sensor is facilitated, and the risk of interfering with other sensor systems within the generator housing is mitigated.

In embodiments, the bracket is configured for supporting the particulate sensor above an interior surface of the generator housing.

In embodiments, the particulate sensor comprises an elongate body terminating in the detector end.

In embodiments, when mounted, the elongate body projects through the generator housing for locating the detector end within an interior of the generator housing. In this way, the sensor may be mounted to the exterior of the generator housing, but project through an aperture into the interior for positioning the detector end into the housing cavity. As such, when the generator is operating, the detector end is located in the airflow within the interior cavity, whilst at the same time the sensor may still be easily accessed.

In embodiments, the mounting is configured for mounting the particulate sensor through an end plate of the generator housing. In this way, consistent measurement of debris accumulation may be achieved. In embodiments, the mounting may comprise a plug for plugging an aperture in the generator housing through which the particulate sensor extends. The aperture may be an inspection hole provided in the drive end of the generator housing.

In embodiments, the particulate sensor comprises a magnet and an inductance coil, and the processor monitors the accumulation of particulate debris based on the inductance in the inductance coil caused by particulate debris accumulated by the magnet. In this way, the airflow within the housing provides a carrier for ferrous wear and failure particles that have been released, and the sensor provides for real-time monitoring of the quantity of these particles as an indicator of the status of the generator.

In embodiments, a potential fault is identified at least in part by the accumulation of particulate debris exceeding a threshold. In embodiments, a potential fault is identified at least in part by the detection of an acceleration in the accumulation of particulate debris. The processor may automatically generate a warning indicator when a potential fault is identified.

According to a third aspect of the present invention, there is provided a sensor for an early fault detection system in a wind turbine generator, comprising: a detector end for detecting the accumulation of particulate debris; a mounting for mounting the detector end within the generator housing, wherein the detector end is configured to accumulate particulate debris from airflow within generator housing for identifying a potential fault based at least in part on the accumulation of particulate debris.

Illustrative embodiments of the present invention will now be described with reference to the accompanying drawings in which.

Wind turbine electrical generators are particularly prone to failure. Machine forensics undertaken after failure indicate that the most common root causes stem from the mechanical stresses applied to components by the electromagnetic forces, static and cyclic loads, and differential expansion forces generated during generator operation. A particularly common issue relates to the ejection of stator wedges and the subsequent failure of the associated stator slot assembly.

Figure 1:
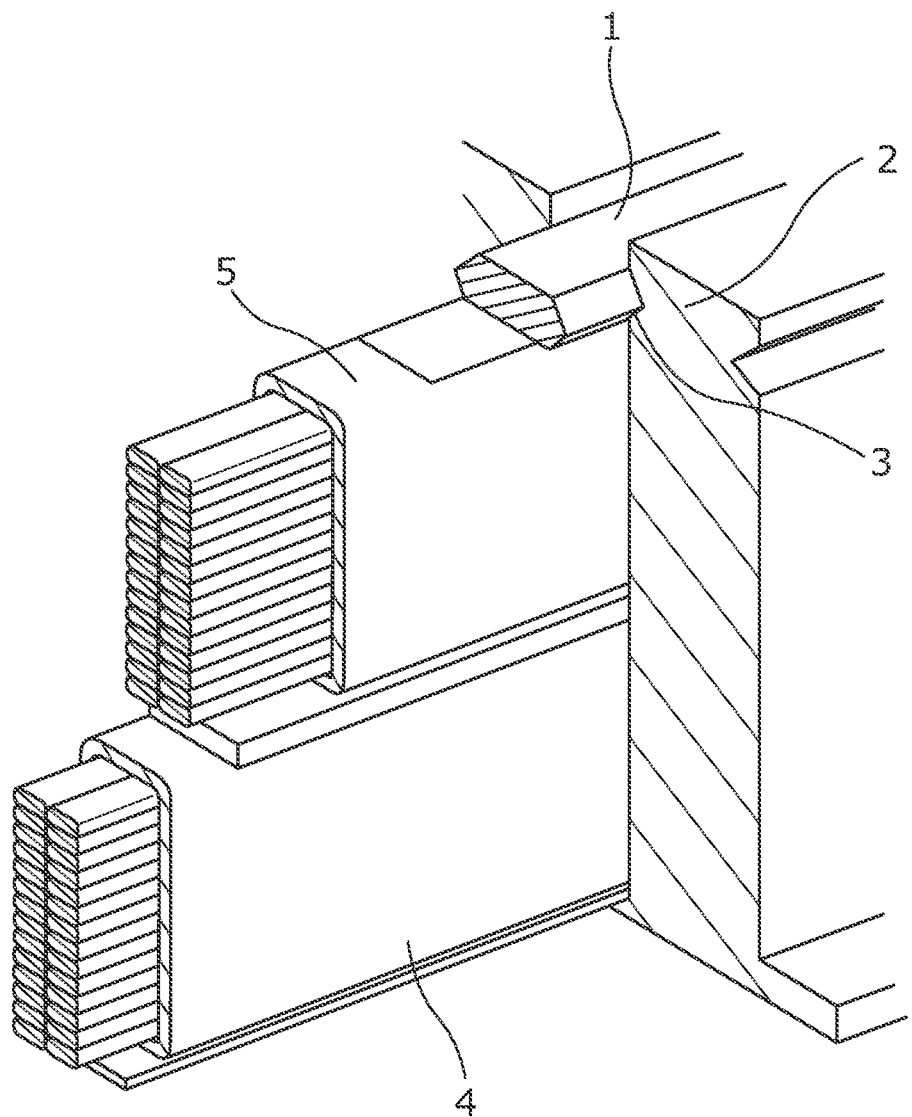
FIG. 1 shows an offset sectioned view of a typical stator slot assembly within a generator.

To explain the above in further detail, FIG. 1 shows a typical stator slot assembly within a generator. The stator comprises a plurality of these slot assemblies in an annular arrangement surrounding the generator's rotor. Each slot is defined in the stator core 3 and receives first and second coil bars 4 and 5, along with associated insulation and filler members. The coil bars 4 and 5 are held in place by stator wedge 1, which is keyed into corresponding formations provided in the stator core 3 at the top of each slot. The wedge 1 is formed of a ferromagnetic composite and acts to hold the stator winding in place and to reduce harmonics.

In use, the generator's rotor will be driven by the turbine's rotor blades, thereby inducting a current in the stator coils 3 and 5. Over time, the wedge 1 may begin to loosen due to the mechanical stresses applied. As this loosening progresses further, the deterioration of the wedge structure accelerates, leading to even larger vibrational movements and further wedge wear. This wear process releases macroscopic particles and other debris. The present inventors have found that, rather than just settling as debris deposits adjacent to the wear location, a proportion of the particulate debris is swept up and carried in the circulating airflow generated as the rotor spins. Consequently, as the wedge wear progresses, the amount of debris carried into the airflow also increases.

Figure 2:
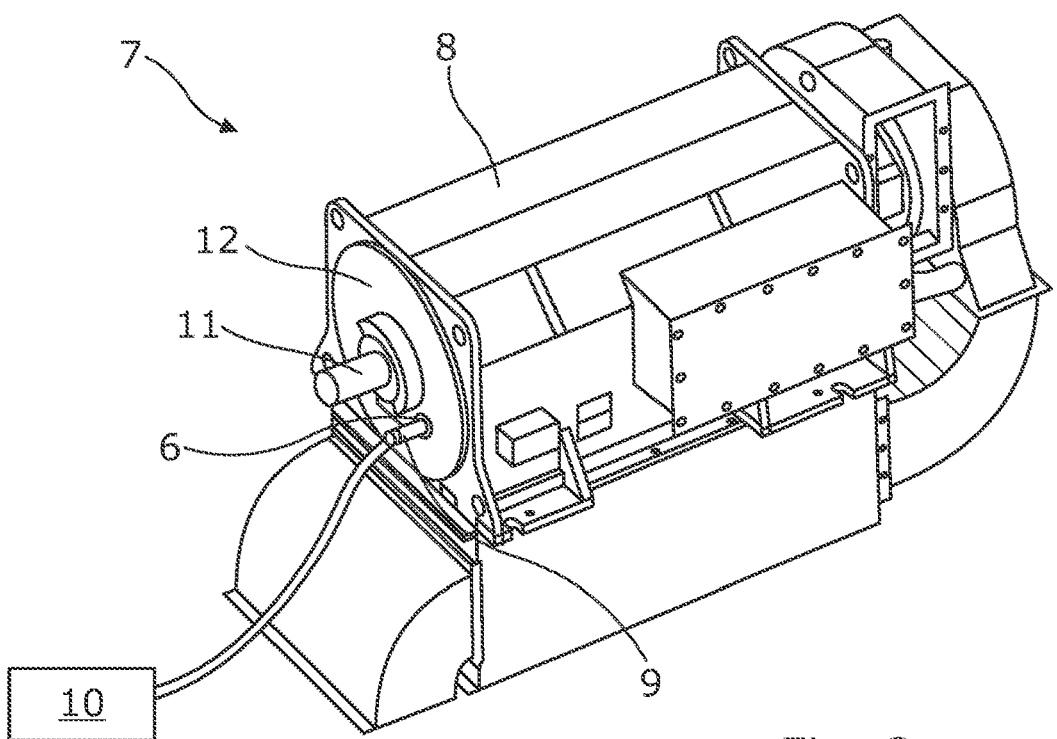
FIG. 2 shows an isometric view of a generator fitted with an early fault detection system of a first illustrative embodiment of the invention.
Figure 3:
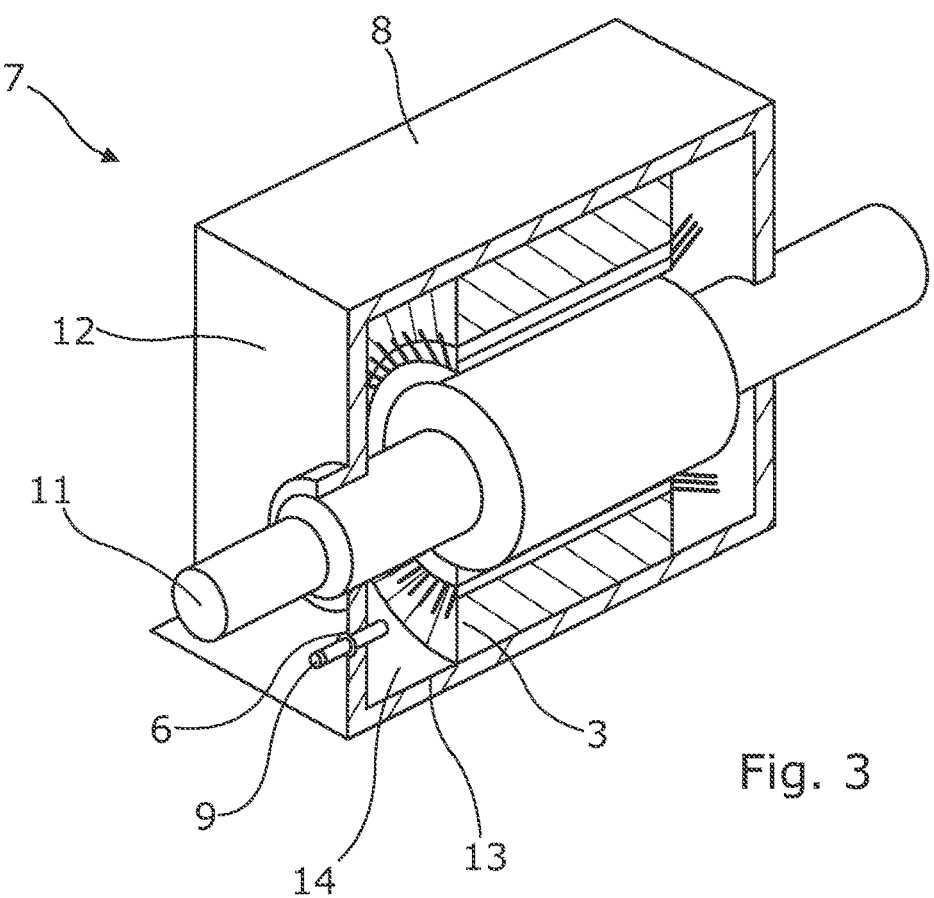
FIG. 3 shows a simplified schematic cross-section of a generator fitted with the early fault detection system according to the first illustrative embodiment.

FIGS. 2 and 3 show views of a generator 7 fitted with an early fault detection system of a first illustrative embodiment of the invention. As shown in FIG. 2, the generator 7 comprises a housing 8, having a body housing the rotor 11 and closed by two end plates. The drive rotor 11 protrudes through the drive end plate 12 at the front of the generator 7.

The debris sensor 9 is mounted to the drive end plate 12 via mounting 6, and projects thorough an inspection aperture provided in the drive end plate 12 into the interior of the housing 8. The debris sensor 9 is connected to a processor 10 for interpreting the sensor signals. In this embodiment, connection between the debris sensor 9 and the processor 10 is established through a wired connection, although it will be understood that wireless connections are also possible. For example, the debris sensor 9 may be wirelessly connected to a gateway or router for transmitting signals to a remote processor 10 located, for example, onshore.

FIG. 3 shows a simplified schematic cross-section of the generator 7 shown in FIG. 2. The debris sensor 9 projects through into the interior cavity 14 of the housing 8. The distal end of the debris sensor 9 projects from the interior wall of the drive end plate 12 and is supported in an elevated position above the floor 13 of the housing 8. As such, when the rotor 11 is driven to rotate during operation, air is circulated within the interior cavity 14 and the detector end of debris sensor 9 projects into the airflow.

Figure 4:
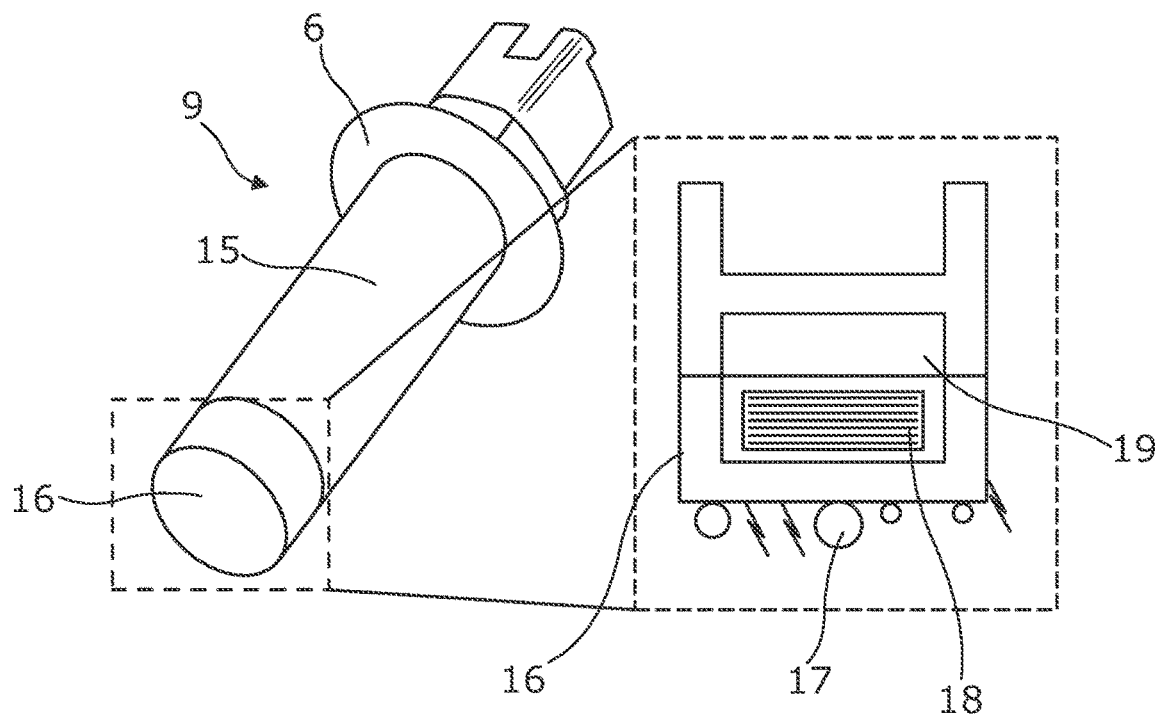
FIG. 4 shows an isometric of a debris sensor used in the early fault detection system of FIG. 3, with an enlarged schematic cross section of the detector end.

FIG. 4 shows an enlarged view of the debris sensor 9. The debris sensor 9 comprises a tubular body 15, with the proximal end providing a connector for connection to the processor 10, and the distal end 16 housing the sensor components. The mounting 6 is provided for attachment to the drive end plate 12 of the housing 8. In this embodiment, the debris sensor 9 is fitted through an inspection hole provided in the drive end plate 12, with the tubular body 15 projecting through the inspection hole, and the mounting 6 attaching to an exterior face of the drive end plate 12.

The distal end 16 of the debris sensor 9 comprises an internal cavity housing a permanent magnet 19 and an inductance coil 18. In use, ferromagnetic particulate debris 17 released from the wedge 1 and carried in the airflow will accumulate on the distal end 16, attracted by the magnet 19. This accumulation may then be detected by the inductance coil 18 to provide an indication of the amount of debris that has been accumulated. Over time, the debris sensor 9 will continue to capture debris 17 from the airflow as the wedge 1 continues to wear. As such, the quantity of particulate debris 17 at the distal end 16 will build as the status of the wedge 1 deteriorates.

Figure 5:
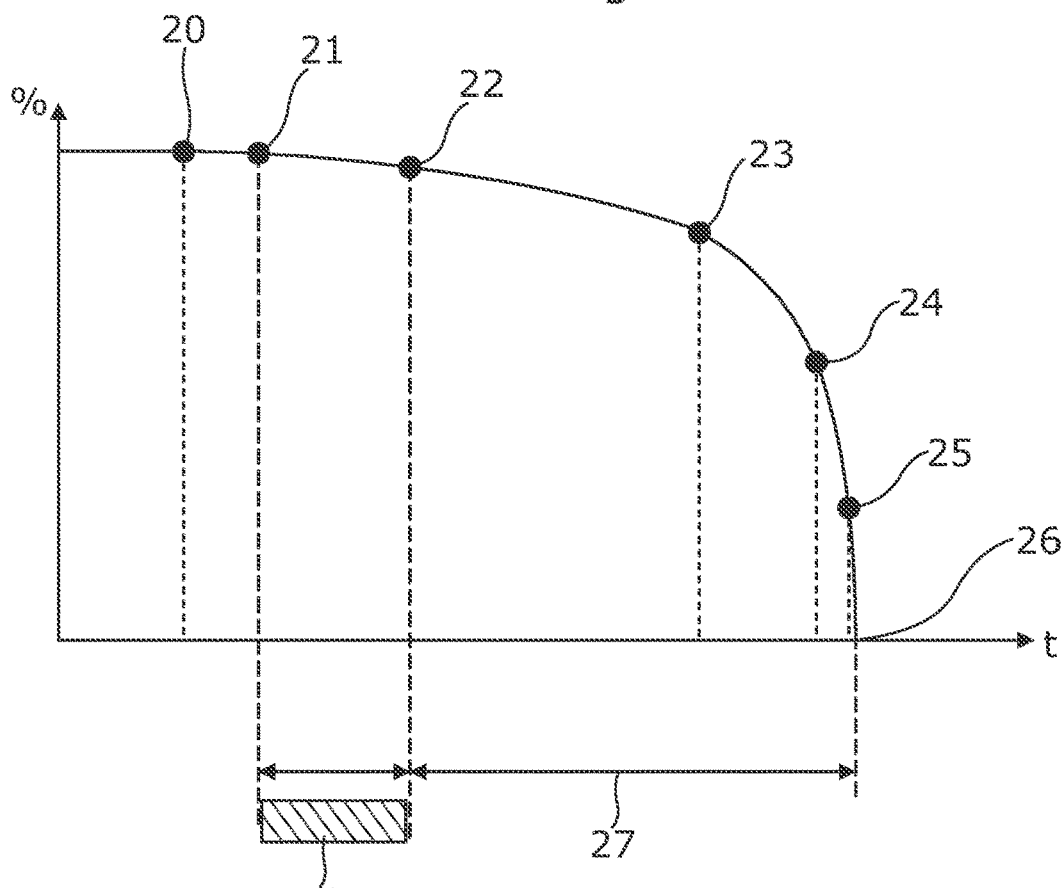
FIG. 5 is a schematic graph showing a representation of how the generator's status deteriorates over a time period prior to a failure event.

FIG. 5 provides a representation of how a generator's status (y axis) deteriorates over a time period prior to a failure event (x axis). Point 20 indicates the start of when damage to the wedges begins. At point 21, the wedge damage has progressed to a sufficient extent that debris particles are present in the airflow within the generator's housing 8. As this wear progresses, deterioration continues to point 22 where one or more of the wedges are able to vibrate within their slots. From here, deterioration of the generator's status begins to accelerate more rapidly, with vibrational noise being produced at point 23, followed by heat at point 24, and smoke at point 25. Eventually, the generator will fail entirely at point 26.

In conventional wind turbine generator arrangements, routine maintenance will often be scheduled at intervals intended to try to identify wedge damage before it reaches the catastrophic failure stage 26. However, in the early stages at points 20-22, it can be difficult to identify potential problems. Furthermore, because the rate of deterioration increases rapidly, it can be hard to pre-empt and often an issue will only be identified after the generator has already failed.

With the disclosed early fault detection system, the accumulation of particulate debris may be monitored in real-time while the generator 7 is operating. Specifically, the processor 10 may use the output from sensor 9 to identify the presence of debris in the circulating air within the generator 7 from point 21 in FIG. 5 onwards. The processor 10 may monitor the accumulation of this debris for identifying when a predetermined threshold is reached or the rate of accumulation of debris begins to accelerate. This may then initiate an alert to indicate that a potential fault has been identified. In embodiments, the processor 10 may automatically generate this early fault alert. In other embodiments, the processor 10 may provide a user with a measurement value or graphical representation for their manual interpretation.

Accordingly, embodiments of the present invention allow for early identification of wedge loosening so that a maintenance operation may be pre-emptively triggered. In preferred embodiments, the debris accumulation threshold is set so that the early warning is triggered during a pre-warning window 28 shown in FIG. 5. This pre-warning window 28 is after point 21 where debris is present in the circulating air, but prior to point 22 where wedge vibrations are present. This allows early fault detection by a period corresponding to pre-warning time 27, which in practice may be around 3-6 months, and potentially up to 12 months in advance. As such, a maintenance operation can be scheduled to allow the main generator components to be exchanged before they deteriorate to the extent that they could fail.

Figure 6:
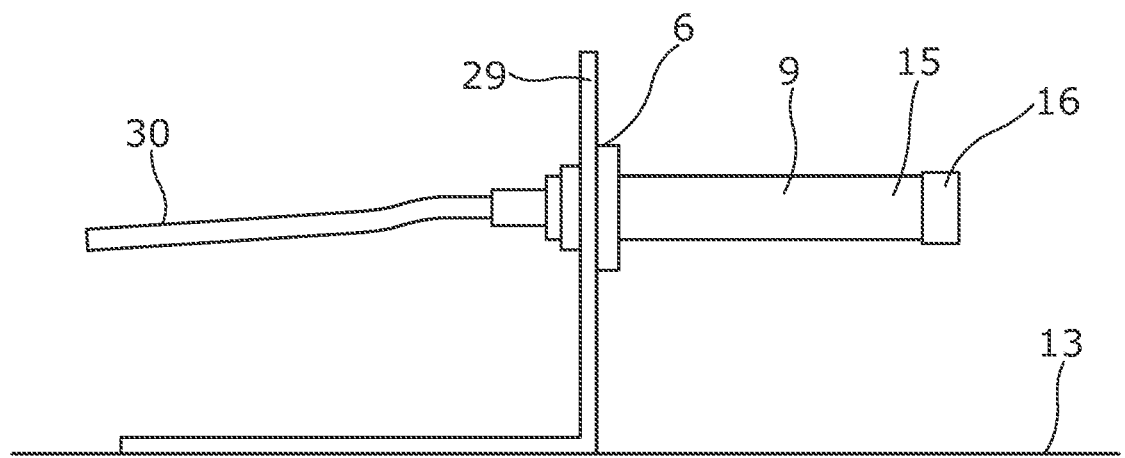
FIG. 6 shows a side view of a debris sensor and bracket used in an early fault detection system of a second illustrative embodiment.
Figure 7:
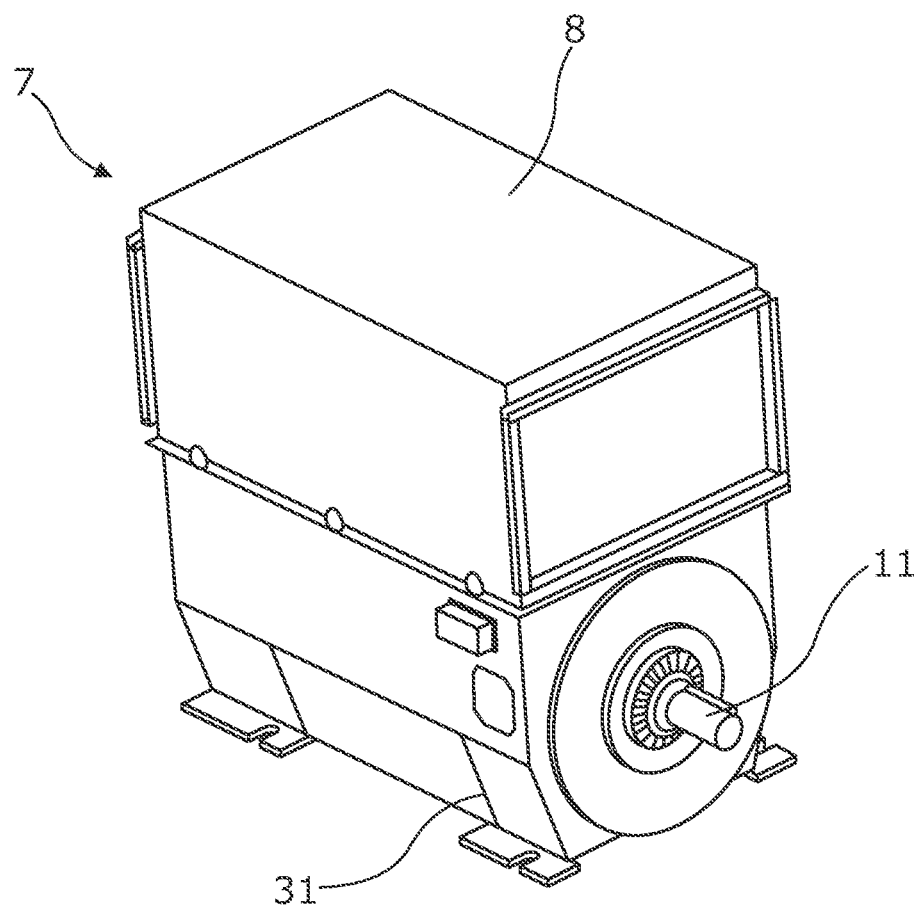
FIG. 7 shows an isometric view of a generator fitted with the early fault detection system shown in FIG. 6.

FIGS. 6 and 7 show an early fault detection system according to a second illustrative embodiment. This second embodiment works in substantially the same way as the first illustrative embodiment, but differs in that the debris sensor 9 is mounted to a bracket 29 which itself is secured to an interior surface 13 within the generator's housing 8. As shown in the side view of FIG. 6, the bracket 29 is provided as an L bracket with a base that secures to the interior surface 13 and an upright section onto which the mounting 6 of the debris sensor 9 is fixed. As such, the distal end 16 of the debris sensor 9 is supported in an elevated position above the interior surface 13 of the housing 8. The debris sensor 9 is connected to the processor for interpreting the sensor signals through the wired connection 30. FIG. 7 shows an isometric view of the generator 7 fitted with the early fault detection system of the second embodiment. The debris sensor 6 and bracket 29 is fitted into the interior of the housing 8 through an inspection hatch 31 provided in a lower front-right side of the housing enclosure.

As with the first embodiment, when the rotor 11 is driven to rotate during operation, air is circulated within the interior cavity of the housing 8 and the debris sensor is supported in the circulating airflow. This thereby allows ferromagnetic particulate debris released from the wedge and carried in the airflow to accumulate on the distal end 16, with the accumulation then being detectable to monitor wear. Advantageously, this embodiment allows for simplified installation through the inspection hatch 31. Furthermore, the mounting via a bracket 29 on an interior surface 13 avoids interfering with other sensor systems within the generator 7. For example, with some generator designs, mounting the debris sensor 9 through an inspection hole in the drive end plate 12 may risk misalignment or damage to the generator's rotational speed sensor.

It will be understood that the embodiments illustrated above show applications of the invention only for the purposes of illustration. In practice the invention may be applied to many different configurations, the detailed embodiments being straightforward for those skilled in the art to implement.

For example, although in the illustrative embodiments the debris sensor is provided in the end plate of the generator housing or mounted on a bracket to an interior surface of the generator, the sensor may also be located in other locations. For example, for some models, the debris sensor may be located in an airflow outlet of the generator. That is, the senor may be placed in the exhaust from an air-cooling arrangement. Equally, in generators employing an enclosed cooling system, the debris sensor may be located in the airflow re-circulation circuit.

The invention claimed is:

1. A method for early fault detection in a wind turbine generator, the method comprising:
    providing a particulate sensor in a generator housing;
    monitoring the accumulation of particulate debris using the particulate sensor; and
    identifying a potential fault based at least in part on the accumulation of particulate debris,
    wherein the particulate sensor comprises a magnet and an inductance coil; and
    the step of monitoring the accumulation of particulate debris comprises monitoring the inductance in the inductance coil caused by particulate debris accumulated by the magnet.

2. The method according to claim 1, wherein the particulate sensor has a detector end, and the step of providing a particulate sensor comprises locating the detector end for projecting into the airflow within the generator housing.

3. The method according to claim 2, wherein the step of providing the particulate sensor comprises locating the particulate sensor such that the detector end is elevated above a base of the generator housing.

4. The method according to claim 1, wherein the step of providing a particulate sensor comprises mounting the particulate sensor to a bracket within the interior of the generator housing.

5. The method according to claim 1, wherein the step of identifying a potential fault comprises determining when the accumulation of particulate debris exceeds a threshold.

6. The method according to claim 1, wherein the step of identifying a potential fault comprises detecting an acceleration in the rate of accumulation of particulate debris.

7. An early fault detection system for a wind turbine generator, comprising:
    a particulate sensor;
    a mounting for mounting the particulate sensor in a generator housing; and
    a processor for monitoring the accumulation of particulate debris using the particulate sensor for identifying a potential fault based at least in part on the accumulation of particulate debris,
    wherein the particulate sensor comprises a magnet and an inductance coil, and
    the processor monitors the accumulation of particulate debris based on the inductance in the inductance coil caused by particulate debris accumulated by the magnet.

8. The early fault detection system according to claim 7, wherein the particulate sensor has a detector end for projecting into the airflow within the generator housing when mounted.

9. The early fault detection system according to claim 8, wherein, when mounted, the detector end of the particulate sensor is elevated above a base of the generator housing.

10. The early fault detection system according to claim 8, wherein the mounting comprises a bracket for supporting the particulate sensor within the generator housing.

11. The early fault detection system according to claim 10, wherein the bracket is configured for supporting the particulate sensor above an interior surface of the generator housing.

12. The early fault detection system according to claim 7, wherein a potential fault is identified at least in part by the accumulation of particulate debris exceeding a threshold, or the detection of an acceleration in rate of the accumulation of particulate debris.

13. A sensor for an early fault detection system in a wind turbine generator, comprising:
    a detector end for detecting the accumulation of particulate debris; and
    a mounting for mounting the detector end within a generator housing,
    wherein the detector end is configured to accumulate particulate debris from airflow within generator housing for identifying a potential fault based at least in part on the accumulation of particulate debris, and
    wherein the sensor comprises a magnet and an inductance coil, and the accumulation of particulate debris is determined based on the inductance in the inductance coil caused by particulate debris accumulated by the magnet.

* * * * *